United States Patent [19]

Duffett-Smith

[11] Patent Number: 5,045,861
[45] Date of Patent: Sep. 3, 1991

[54] NAVIGATION AND TRACKING SYSTEM

[75] Inventor: Peter J. Duffett-Smith, Cambridgeshire, England

[73] Assignee: The Lynxvale - Cril Partnership, England

[21] Appl. No.: 458,615

[22] PCT Filed: Jul. 28, 1988

[86] PCT No.: PCT/GB88/00617
§ 371 Date: Feb. 7, 1990
§ 102(e) Date: Feb. 7, 1990

[87] PCT Pub. No.: WO89/01637
PCT Pub. Date: Feb. 23, 1989

[30] Foreign Application Priority Data

Aug. 10, 1987 [GB] United Kingdom ............... 8718881
Feb. 18, 1988 [GB] United Kingdom ............... 8803754

[51] Int. Cl.$^5$ ............................................. G01S 3/02
[52] U.S. Cl. ................................. 342/457; 342/463
[58] Field of Search ............... 342/457, 453, 463, 464, 342/465, 450

[56] References Cited

U.S. PATENT DOCUMENTS

| | | | |
|---|---|---|---|
| 3,242,492 | 3/1966 | Honore et al. | 342/393 |
| 3,774,209 | 11/1973 | Fleming et al. | 342/386 |
| 3,774,215 | 11/1973 | Reed | 343/100 |
| 3,889,264 | 6/1975 | Fletcher | 343/105 |
| 4,054,880 | 10/1977 | Dalabakis et al. | 343/112 |
| 4,169,245 | 9/1979 | Crom et al. | 455/132 |
| 4,305,077 | 12/1981 | Tsumura | 342/451 |
| 4,636,795 | 1/1987 | Dano | 342/387 |
| 4,651,156 | 3/1987 | Martinez | 342/457 |
| 4,751,512 | 6/1988 | Longaker | 342/357 |

FOREIGN PATENT DOCUMENTS

| | | | |
|---|---|---|---|
| 3242997 | 5/1984 | Fed. Rep. of Germany. | |
| 0119476 | 5/1987 | Japan | 342/387 |
| WO89/4002 | 5/1989 | PCT Int'l Appl. . | |

Primary Examiner—Gregory C. Issing
Attorney, Agent, or Firm—Venable, Baetjer, Howard & Civiletti

[57] ABSTRACT

The invention concerns a navigation and tracking system, for monitoring the movement of a roving object which carries one of a pair of receiving stations (D, E) the other receiving station being at a known position. Signals are transmitted by a number of independent transmission sources (A, B, C) equal at least to the number of dimensions in which movement is to be monitored. A link (F) passes a representation of the signal or signals received at one of the receiving stations (E) to the other receiving station (D) and means (R, S, T, U) at the other receiving station compares the signal representations and determines the phase difference or time delay between the received signals and hence the change in phase difference or time delay of the signals as the object moves. The movement of the object relative to the transmission source or sources and hence its position can thus be determined.

20 Claims, 8 Drawing Sheets

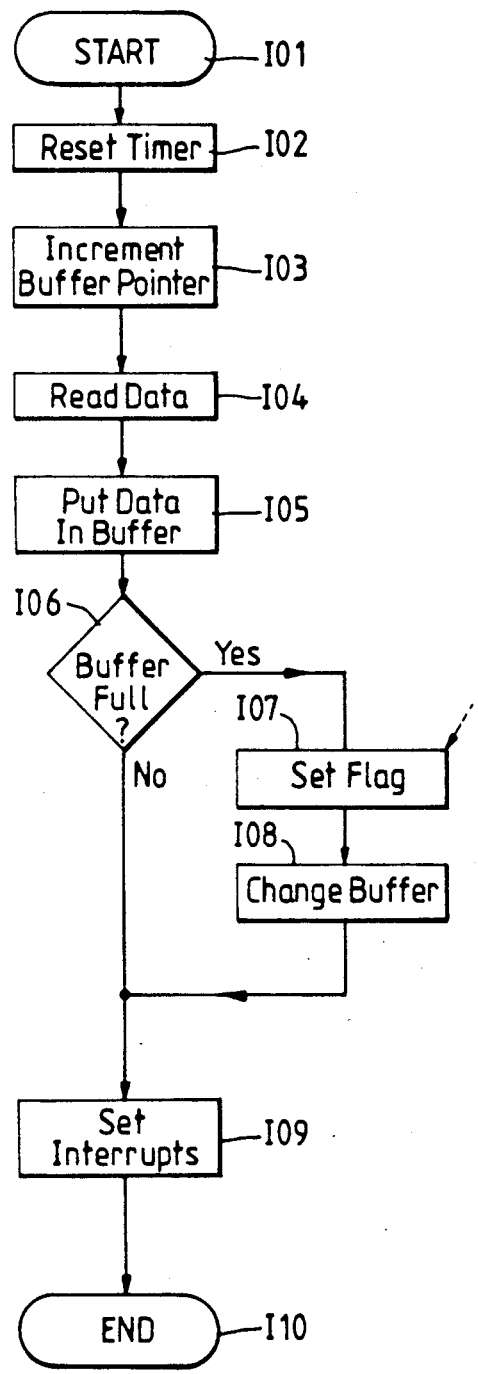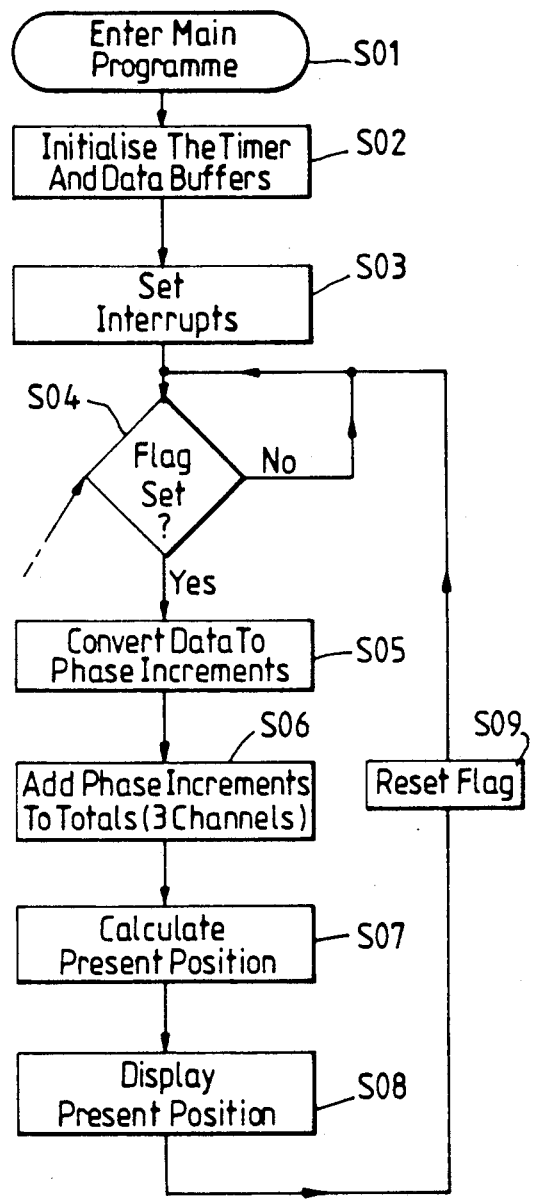

NAVIGATION AND TRACKING SYSTEM

This invention relates to a navigation and tracking system using radio or other broadcast transmissions.

A navigation system is a means by which the position of a navigator can be determined, either by the navigator himself, or at another location from which the information is relayed to the navigator or is used to direct his progress. A tracking system is a means by which the position of a remote roving point may be tracked at one or more base stations, the coordinates defining the position of the rover being continuously available at each base station. There are many different systems.

For example, conventional radio navigation systems are known which use the signals from two or more pairs of special radio transmitters, and fall into two distinct categories (1) time referencing, and (2) phase referencing.

Systems in the first category include the Long Range Navigation System (LORAN-C) set up by the U.S. Coastguard. The radio transmissions take the form of radio pulses whose times of arrival at the roving point can be accurately measured. The navigator uses a special receiver to determine the time difference between the reception of pulses from each of a pair of such transmitters. This information defines a curve on which he must lie, along which all points have the same difference in distance from the two transmitters. The navigator then measures the time difference between the reception of pulses from a second similar pair of transmitters. The information defines a second curve and the point of intersection of the two curves is the position of the navigator. In general, there is more than one point of intersection, but the navigator usually knows roughly where he is and can select the correct one, or he can use signals from a third pair of transmitters to determine his position uniquely.

Systems in the second category include the Decca Navigation System. In such systems the radio transmissions from a pair of transmitters are coherent with each other, that is, they maintain a predictable phase relationship at all times. In the simplest case, they may be continuous sinusoidal transmissions of exactly the same frequency. The transmissions then form an interference, or 'fringe', pattern in which curves of minimum and maximum intensity may be identified. The navigator measures the fluctuations in intensity as he moves around. He also measures the fluctuations in intensity of signals from another pair of coherent signal transmitters. If he knows his position at the start, he can determine his position at any subsequent time by counting the numbers of fringes of each pair that he has crossed, thereby establishing a point of intersection of the fringes and hence his location within the intersecting fringe patterns. A similar system is described in U.S. Pat. No. 3,889,264 which shows the use of pairs of transmitters to create plural grids of isophase hyperbolic lines, two or more pairs being required for tracking purposes.

Other systems rely on signals transmitted by a roving object whose position is to be measured. U.S. Pat. No. 4,651,156 discloses a system in which the position of a roving object is measured by comparing the phase of a range tone transmitted by the rover with that transmitted by a fixed transmitter. U.S. Pat. No. 4,169,245 discloses a system for tracking a roving transmitter by estimating the differences in times of arrival of signals at two pairs of spaced receivers, using the spread of frequences associated with modulation of the carrier transmission wave.

In U.S. Pat. No. 3,774,215 the system shown uses OMEGA (very low frequency) transmitters transmitting to a roving object, the roving object receiver detecting differences in phase between a reference signal and the received transmissions. Phase difference data is transmitted to a communication station where it is analysed in a computer and positional data determined therein is transmitted back to the roving receiver.

U.S. Pat. No. 4,054,880 discloses the use of three transmitters, the phases of which are compared with a local oscillator reference signal, measured phase difference data being passed to a central station for correction of phase drifts in the transmitters and reference oscillators.

The present invention is intended to overcome problems of the prior systems, particularly with regard to the necessity for dedicated transmitters and the need to provide these in pairs.

According to the present invention a navigation and tracking system, for monitoring the movement of a roving object, comprises a pair of receiving stations for receiving the signals transmitted by a number of independent transmission sources equal at least to the number of dimensions in which movement is to be monitored, in use, one of the receiving stations being at a known position and the other being located on the roving object; means for passing a representation of the signal or signals received at one of the receiving stations to the other receiving station; means at the other receiving station for comparing the signal representations and for determining the phase difference or time delay between the received signals and hence the change in phase difference or time delay of the signals as the object moves, in order to determine the movement of the object relative to the transmission source or sources and hence its position.

When phase differences are measured the position of the roving object is not determined "absolutely", but only relative to a known starting position. Furthermore, the phases must be monitored continuously so that they may be tracked through ambiguous cycles of 360°. Each error of one cycle introduces an error in position at least as large as one wavelength. A particular advantage of the system described is that the transmitters used may have any spectral characteristics provided that the signals are continuous (in the sense that there are no long gaps—pulsed transmissions are allowed if the repetition rate is high enough). Continuous wave unmodulated transmissions will therefore suffice. In principle, two transmitters are needed for navigation and tracking over a plane, but in practice three are required since the unknown and variable offset between the reference oscillators at the receiving stations must also be measured.

When the signals from the transmitters are modulated, the spread of frequencies within the bandwidth of the modulation enables timing delays between the transmitted signals received at the two receiving stations to be determined and used instead of or in addition to phase difference measurements.

If the system is primarily a navigation system then the comparison and position determining means will preferably be located in the receiving station on the roving object, but if it is located at the base station then the position of the roving object can be signalled back to the roving object. If the system is primarily a tracking system then signalling back the position of the roving object to the roving object receiving station may not be required.

Although the transmission sources will preferably be radio sources, particularly where the system is to operate say for tracking vehicles, transmission at any frequency is envisaged, using waves of any type, such as sound signals, which might be used, for example in laboratory systems.

In a land based system for determining location over a localised area of the Earth's surface, two transmission sources at least will be required, but the system may be used to determine the distance moved by an object that is constrained to move along a fixed path, in which case a single transmission source only may be required.

Preferably, when using measurements of phase differences, the two receiving stations convert the signals received to baseband signals by the use of local oscillators which are phase-locked to local frequency standards or reference oscillators and the baseband signal from one of the receiving stations is transmitted to the other. In this case it is an advantage if the system includes an additional transmission source for measuring the drift of the reference oscillators or frequency standards, but an alternative is to lock the reference oscillators to one another using the transmission link between the two receiving stations.

The system may also include the transmission sources themselves, but since there does not need to be any specific phase relationship between them, the sources used by the system may be any existing radio transmitters.

The system of the invention differs from conventional systems such as those described above in the opening paragraphs in that (i) a single transmitter or transmitters are used rather than pairs of transmitters, (ii) the signals are received at two points rather than one, (iii) the signals received at one point are relayed to the other and compared there to determine their phase or time delay difference, (iv) almost any radio transmitters may be used for this purpose provided that their positions are known.

Time delay measurements, for example, may use amplitude modulated signals in the long, medium or short wavebands which usually occupy bands of about 10 kHz width each, frequency modulated VHF broadcasts which have widths of about 150 kHz, or TV signals in the UHF band which occupy several MHz each. The time delays between the arrivals of the signals at the two receiving stations from a modulated transmitter may be measured with an accuracy which is inversely related to the bandwidth (all other things being equal). The time delays are unambiguous quantities in the sense that there are no recurrences of 360° as there are when determining phase differences and thus the time delays measured may be used to determine the position of the roving object without reference to a starting position.

In either system there may be advantages in placing the non-roving receiving station (base station) at the same location as one of the transmitters. This is especially so when the system is used for navigation rather than tracking and correlation and processing would preferably take place on the roving object, the link being provided in the direction from the base station to the roving object. If the base station which transmits the link signals to the roving object has an omni-directional radiation pattern then any number of separate roving objects can use the same link signals. This is equivalent to setting, say $c=0$ in equation 1C below.

Additionally, whether or not the base station is at the same location as one of the transmitters, the transmissions from the transmitter may be used to provide the link, by suitable modification, for example, in a in which the base station receives the signals from all three transmitters and mixes them to baseband and inserts them into the modulation of the transmissions from the transmitter at which it is located. It may be possible to do this without interference with the normal use of the transmissions; for example, when the transmitter is a domestic broadcast FM repeater, the link signals may be inserted between the side band signals so that normal reception of the FM signals will not be affected, but the receiver on the or each roving object is able to extract the link signals from the modulation and use them to measure the phases or time delays as previously described.

There may also be advantages, in some applications, in using the same reference oscillator for the transmitter and co-located base station. There may also be advantages in modifying every transmitter in the way described in the immediately preceding paragraph. In that case, every roving receiving station then has a link built in to every transmission it receives, thus giving considerable redundancy in the system and hence increased freedom from errors. When the system is being used to track the position of a roving object, there may also be advantages in using the link transmitter itself on the roving object as one of the three triangulation transmitters. Thus, the roving object receives transmissions from two independent fixed transmitters, and transmits baseband representations of their signals over the link. The base station also receives signals from the two fixed transmitters, but additionally measures the link signals themselves as if they had come from the third fixed transmitter. This is equivalent to setting, say, $c=r$ in equation 1C below, and is also equivalent to using the link to lock the local oscillators.

In the examples given below, conventional broadcasting VHF transmitters are used, but naturally occurring transmission sources, such as radio stars, might also be used especially for space navigation.

Two examples of systems illustrating the principles of the invention and one example of a prototype system constructed in accordance with the invention will now be described with reference to the accompanying drawings in which:

FIGS. 10A and 10B illustrate, by way of flow charts, the signal processing which takes place in the base station computer to determine the path of the roving receiver.

Figure 1:
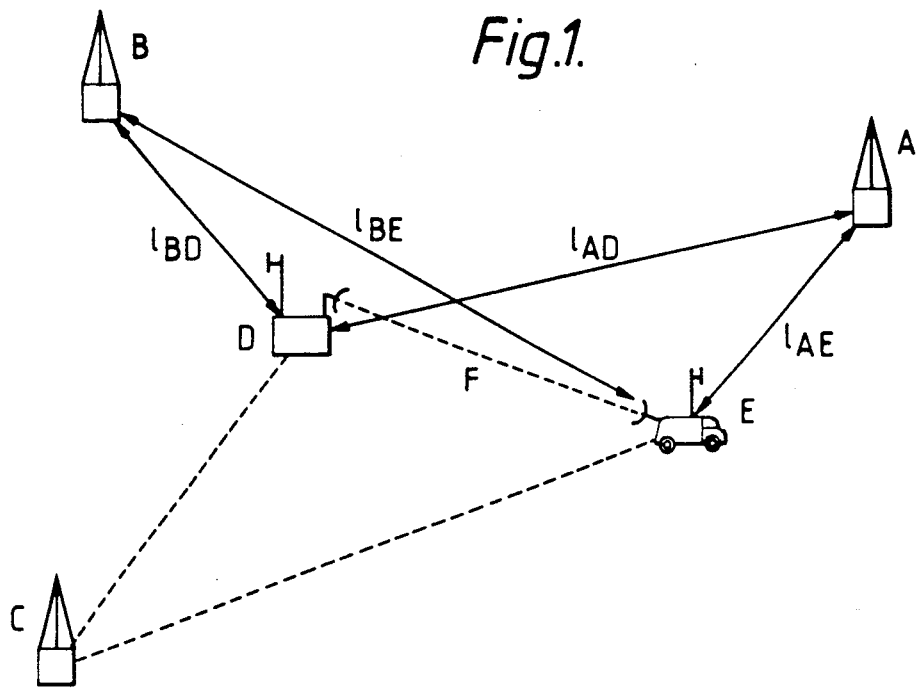
FIG. 1 shows a typical arrangement of transmitters and receiving points.

The particular systems shown are land based systems and rely on using transmitters A and B and, optionally a third transmitter C.

The first example relates to a system in which phase differences are used to track the position of receiver.

The signals from the transmitter A are received at a base station D (which is a known length $l_{AD}$ away from the transmitter A) and at roving point E, whose position is to be tracked or determined (and which is an unknown distance $l_{AE}$ from A). The receivers convert the incoming signals, within a reception band of finite bandwidth, to baseband (see below) and those from the roving point E are then relayed to the base station D by means of a link F. This link F might, for example, take the form of a dedicated telecommunications link, or non-dedicated one such as a public cellular radio telephone network. At the base station D, the signals received directly from A are compared with those received at E to determine their phase difference $P_A$. The phase difference $P_A$, measured in degrees, is equal to the value:

$$(l_{AD} - l_{AE}) \cdot 360/n \cdot \lambda_A$$

where $l_{AD}$ is as before, $l_{AE}$ is the distance from A to E, $\lambda_A$ is the centre wavelength of the reception band, and n is an integer. This process of determining $P_A$ is one of multiplication, averaging, and mathematical analysis (see below). The measured phase difference may be converted directly into a path length difference (modulo one wavelength) as the centre wavelength $\lambda_A$ of the emissions received from A can be determined by any conventional means.

Now, because the path length difference $(l_{AD} - l_{AE})$ can be determined, and as $l_{AD}$ is known, the possible values of the distance $l_{AE}$ can be calculated. Thus E lies on one of a number of spheres (on a ground based system these can be considered to be circles) of radius $l_{AD} - P_A \cdot n \cdot \lambda_A/360$.

The signals received at D and E from the transmitter B (in a band whose centre wavelength is different from that of A) are treated in the same fashion to determine their phase difference $P_B$, and this defines a second set of circles of radius $l_{BD} - P_B \cdot m \cdot \lambda_B/360$ centred on B on one of which E must also lie. m is an integer and $\lambda_B$ is the centre wavelength of the transmission received from B. The location of E is then one of the points of intersection of two circles, one centred on A and one on B.

In order to determine the position of E uniquely, the tracking or navigation process begins by calibration. The rover E must know his initial position with respect to the base station D since the procedure outlined above produces an ambiguous result both because (i) there are two points of intersection of each pair of circles, and (ii) the phase differences $P_A$ and $P_B$ determine the radii of the circles modulo one wavelength, and not uniquely. $P_A$ and $P_B$ may initially be any values and preferably are set to zero by starting E at D for example. Thereafter, as the rover E moves away from the starting position at D, the values of $P_A$ and $P_B$ are continuously monitored, and their values at any time define the current position of E uniquely.

For example, suppose that the transmissions from A and B are both centred on wavelengths close to 3 metres. Initially, $P_A$ and $P_B$ are both zero (the rover is at the base station) and after some movement of E they may take the values 1620° and −3240° respectively, corresponding to differences of distance of 13.5 and −27 metres. Thus we know that E has moved from its (known) starting position in such a way as to increase its distance from A by 13.5 metres, and to decrease its distance from B by 27 metres. Its new position is therefore determined.

During movement of E the phases must be monitored sufficiently often to ensure that no changes of more than 180° occur between one signal sample and the next. If interruptions occur, either in the transmissions from A and B or in the link F, the immediate histories of the phases might be used to interpolate over the interruption or an error-correcting transmission protocol may be used to overcome the problem if the error is in the transmission link. Otherwise, each 360° of phase introduced, and not accounted for, results in an error in position of at least one wavelength (3 metres in this example).

Figure 2:
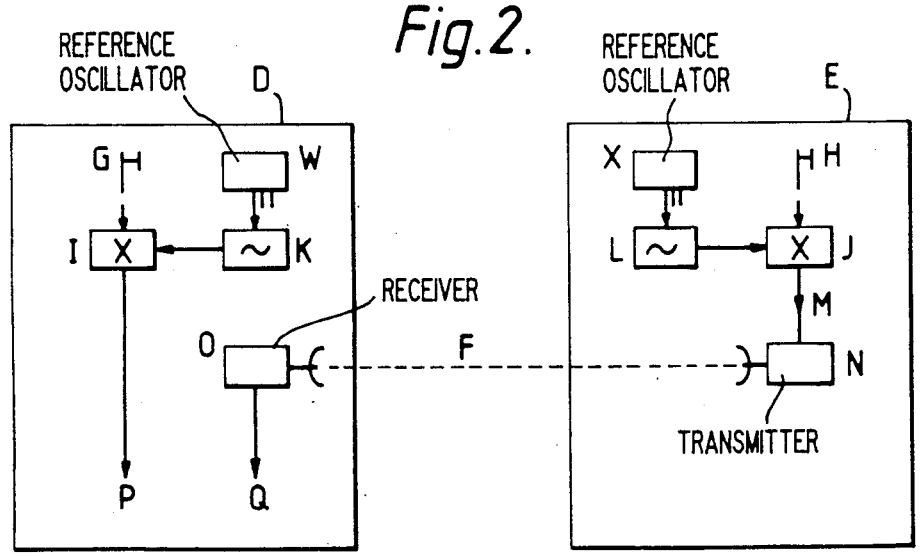
FIG. 2 illustrates how the signals received from the transmitters are processed.

The process of signal conversion to baseband at D and E is illustrated in FIG. 2. The signals received from A by the antennas G and H are multiplied in mixers I and J with sinusoids generated by local oscillators K and L. Baseband products are output at P and M. Those from the roving station are then transferred to the base station via the link F using transmitter N and receiver O, and appear at Q. The signals at P and Q can be compared (see below) to determine their phase difference. This will reflect the movement of E described above.

The signals received from B are treated in the same manner using a different set of mixers and local oscillators (not shown).

There is one combination of mixer and local oscillator for each transmitter to be monitored. All the local oscillators at each station are phase-locked to common reference oscillators W and X. However, as technology has not yet advanced sufficiently far for the construction of reference oscillators W and X of sufficiently high stability, any drift in either or both of their frequencies results in a corresponding change in the calculated phase difference between P and Q. Thus it may appear that E is moving, when in reality it is stationary.

This problem may be overcome using a third transmitter C (FIG. 1). Its signals are received at D and E and are used to correct drifts in the reference oscillators W and X. In effect, the reference oscillators are both locked to C. If the frequency of C varies, it does not matter since both reference oscillators W and X are corrected by the same amount, their frequency difference remaining zero.

Note that the (changing) path of the link F does not have a significant effect on the phase difference as the signals are converted to baseband (near zero frequency) before conveyance over the link. Furthermore, use of a double sideband transmission system offers immunity to errors of this sort.

An alternative is to lock one reference oscillator to the other using the transmission link F.

Figure 4:
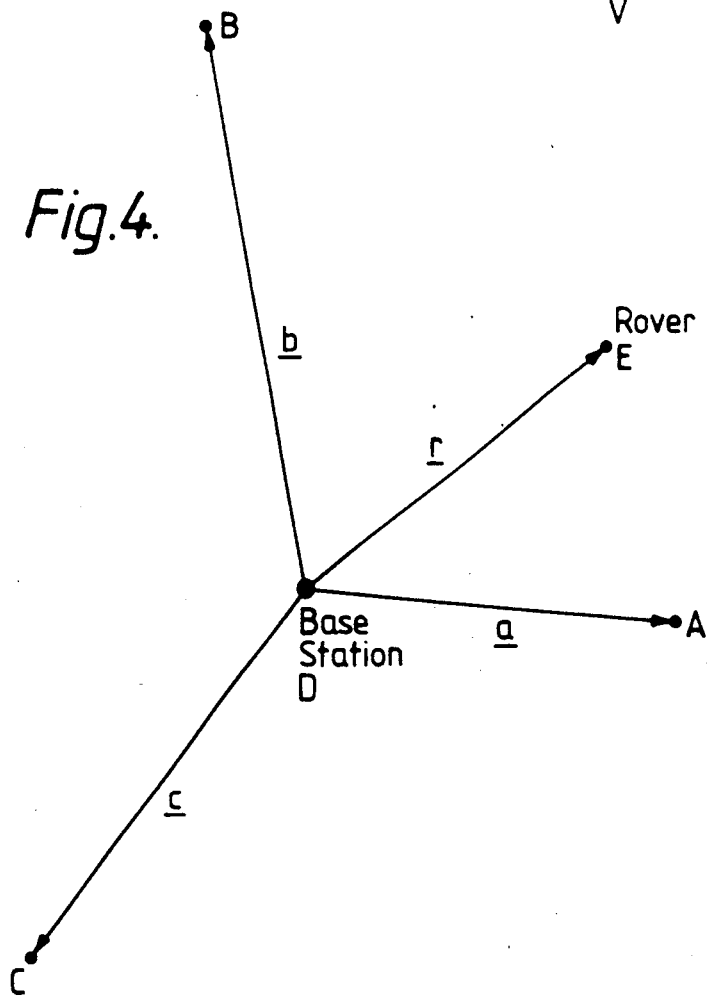
FIG. 4 is a vector diagram of the system.

In practice, the signals from A, B, and C are all treated in exactly the same manner to produce phases $P_A$, $P_B$, and $P_C$. Three non-linear equations involving the two unknown coordinates of E, and the unknown phase drift of W relative to X, can then be solved to determine the unknown quantities. This can appreciated from the following, which should be read in conjunction with FIG. 4.

If A, B, and C are at vector positions a, b, and c relative to the base station D and the rover is at a vector position r and if the three transmitting stations operate at centre wavelengths of $\lambda_A$, $\lambda_B$, and $\lambda_C$, then as $P_A$, $P_B$, and $P_C$ are measured, r and $P_o$ (the varying phase difference between the reference oscillators W and X) can be determined from the following equations:

$$\uparrow r-a \uparrow - \uparrow a \uparrow +(q_a-q_o)=0 \qquad \text{1A}$$

$$\uparrow r-b \uparrow - \uparrow b \uparrow +(q_b-q_o)=0 \qquad \text{1B}$$

$$\uparrow r-c \uparrow - \uparrow c \uparrow +(q_c-q_o)=0 \qquad \text{1C}$$

where:

$q_a = \lambda_A P_A/360$, $q_b = \lambda_B P_B/360$, $q_c = \lambda_C P_C/360$, and $q_o = \lambda_A P_o/360$.

Figure 3:
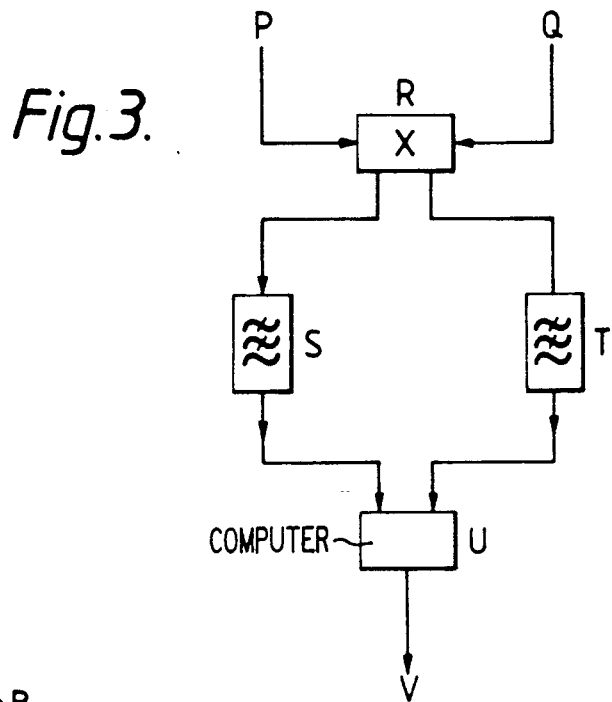
FIG. 3 shows an arrangement for measuring the phase difference between the two signals.

The phase difference between the signals received by D and E can be measured using a process similar to that illustrated in FIG. 3. The signals P and Q, which may have significant bandwidths, are multiplied in a multiplier R. This could, for example, be a digital correlator or a linear multiplier. Two products in phase quadrature are output and averaged in low-pass filters S and T. It should be noted that, in practice, it may be simpler to produce two signals, P and P′, by mixing with separate oscillators in phase-quadrature before correlating with Q in two separate multipliers R and R′ to produce phase-quadrature products S and T. We can conveniently think of these averaged products as 'sine' and 'cosine'. A computer U performs the mathematical process of taking the inverse tangent of the fraction sine/cosine, giving the phase difference output at V. This will always be returned in the range $-180°$ to $+180°$, and hence it is necessary to sample sufficiently often to ensure that the change between successive values is less than 180°.

The example described above relates to the two-dimensional case where the transmitters, base station, and rover all lie roughly in one plane (e.g. the Earth's surface over sufficiently small ranges). With perfect reference oscillators, two transmitters would suffice to determine the position of the rover with respect to its starting point; in practice, three are needed as explained above. Greater accuracy and freedom from interruptions may be achieved by using more than this number. The same technique may be applied to the three dimensional case (e.g. navigation in space) when a theoretical minimum of three transmitters, but four in practice, must be used.

The second example relates to a system that uses time delay measurements to track position of a receiver.

If the timing delay between the signals received at the base station D directly from transmitter A and via the roving station E is determined as $t_A$ and if the delay between signals received at base station D directly from transmitter B and via the roving station E is $t_B$ then two non-linear equations can be solved once these quantities have been measured, to determine the unknown coordinates of the roving station E. This can be appreciated from the following which should be read in conjunction with FIG. 4.

If A and B are at a vector positions a and b relative to the base station D and the rover is at vector position r, then if $t_A$ and $t_B$ are measured, r can be found from the equations:

$$\uparrow a \uparrow - \uparrow a-r \uparrow - \uparrow r \uparrow -ct_A=0 \qquad \text{2A}$$

$$\uparrow b \uparrow - \uparrow b-r \uparrow - \uparrow r \uparrow -ct_B=0 \qquad \text{2B}$$

where c represents the speed of light.

In particular it should be noted that the position of the rover can now be determined uniquely without reference to a known starting position so that, in principle at least, the method can be used to find the starting position for subsequent phase tracking.

Timing delays may be measured at any point in time without any reference to any previous measurement and tracking is not required.

Furthermore, the transmitters are likely to have a broad range of spectral characteristics, but they must be modulated, as continuous wave unmodulated transmissions do not provide time delay information. The signals do not have to be continuous, and the wider the bandwidth of the transmissions the more accurately the timing delay may be measured. If there is more than one independent transmitter at the same transmission site, the total bandwidth occupied by the transmissions may be used as if the signals had all come from one source.

In the method of measuring time delays described further below, the maximum bandwidth is used to obtain the highest accuracy.

In practice, two transmitters are needed for navigation and tracking over a plane as previously described, the offset between the oscillators at the two receiving stations being of almost no consequence. However, if three stations are being monitored for phase tracking purposes for greater accuracy, then the accuracy of the position determined from timing delays alone can be improved by averaging. The accuracy with which a position may be determined in practice using time delays will be inferior to that determined by phase tracking by at least one order of magnitude.

Figure 5:
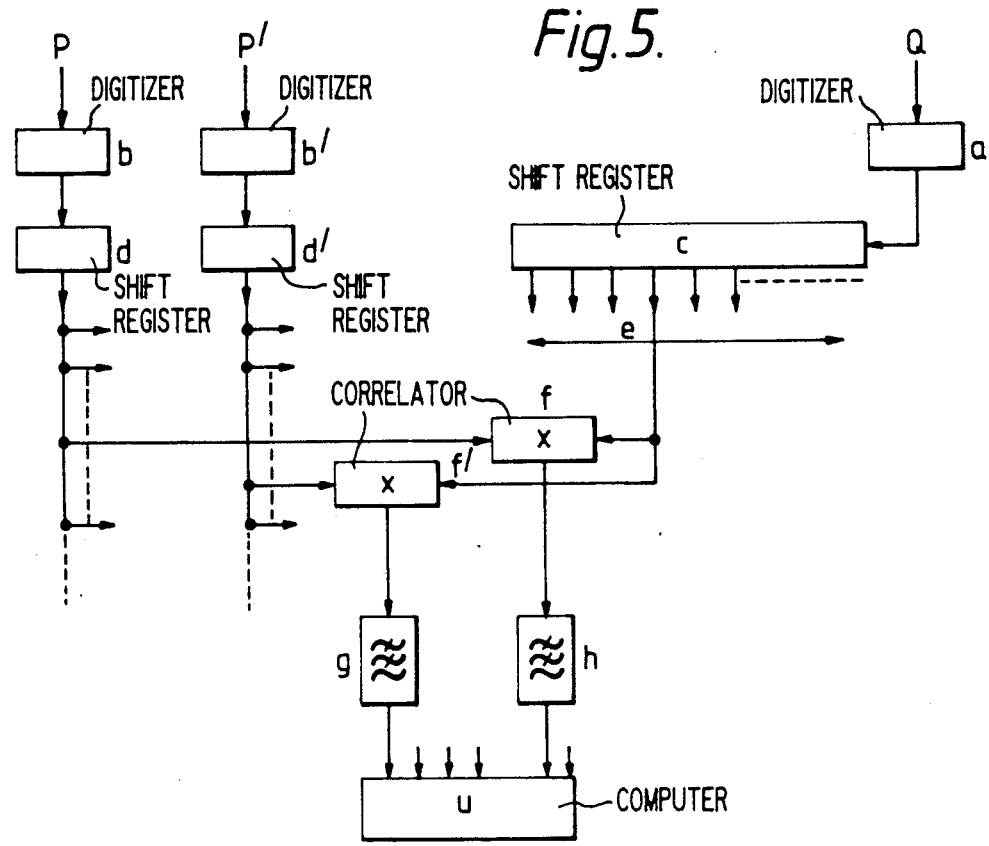
FIG. 5 illustrates an arrangement for determining time delays.

Referring now to FIG. 5, the baseband signals P, P′ are extracted as described in the first example (FIG. 2—it should be noted that in practice P as previously referred to comprises two signals [now P and P′] which have been mixed by separate oscillators in phase quadrature) and are digitized in one bit digitizers a, b and b′ and the outputs of the digitizers are digital representations of the analog input signals. The sampling interval for digitization should be less than half the inverse of the bandwidth BW of the radio signals, i.e. $t_s < (2BW)^{-1}$ (the Nyquist criterion) in order that minimal information is lost in the sampling process. The bit streams from a, b and b′ are delayed in shift registers c, d and d′ respectively. The register c has parallel outputs e each corresponding to a delay of one unit of $t_s$. The shift registers d and d′ each have one output corresponding to half the maximum delay from c so that the outputs from d and d′ correspond in time with the output from e which is half way along the register c, assuming there is no further delay between the signals. Each of the outputs e is correlated (exclusive-OR operations) with the streams from d and d′, two such correlations being shown by f and f′. The correlator X has two outputs corresponding to correlations in phase-quadrature. These are integrated in the low-pass digital filters g and h and the results passed to a computer U.

Figure 6:
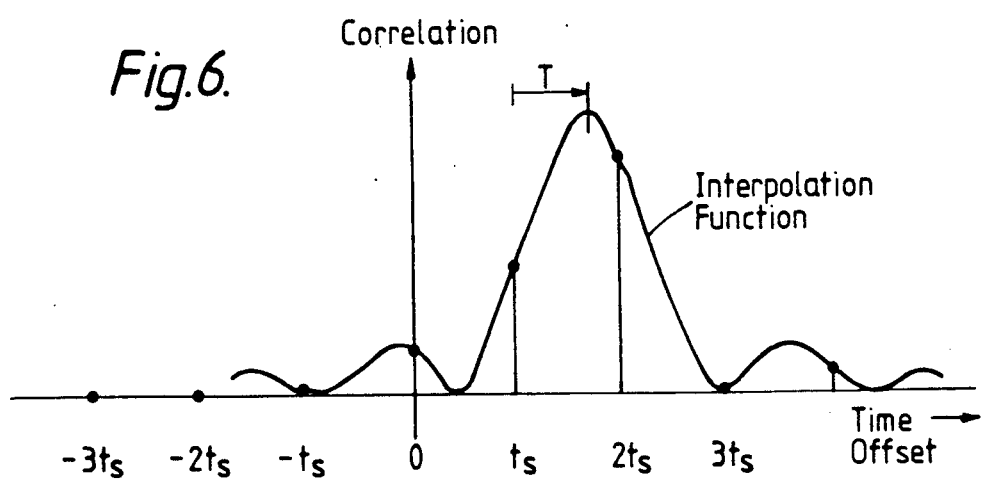
FIG. 6 illustrates the use of an interpolation function for determining time offsets.

The computer U receives parallel correlations, as above, corresponding to steps in the delay between the two signals in units of $t_s$. A plot of the amplitude of the cross-correlation function verses time delay might be as shown for example in FIG. 6. The large dots represent the numbers supplied to the computer and it can be seen clearly that the correlation is largest where the total time offset between the data streams is zero. In FIG. 6 this corresponds to a time delay of $t_s + T$.

It is unlikely that any of the discrete steps in delay which are actually measured will lie exactly on top of the required delay. Instead, the computer must fit an interpolation function (curve shown in FIG. 6) to the measured points to determine the additional offset T. The accuracy with which the peak of the interpolation function can be found limits the accuracy of the method. The interpolation function may be calculated, or measured from the received signals.

FIGS. 7 to 10 illustrates various components and features of a prototype system comprising a mobile unit 1 and a base station 2.

Figure 7:
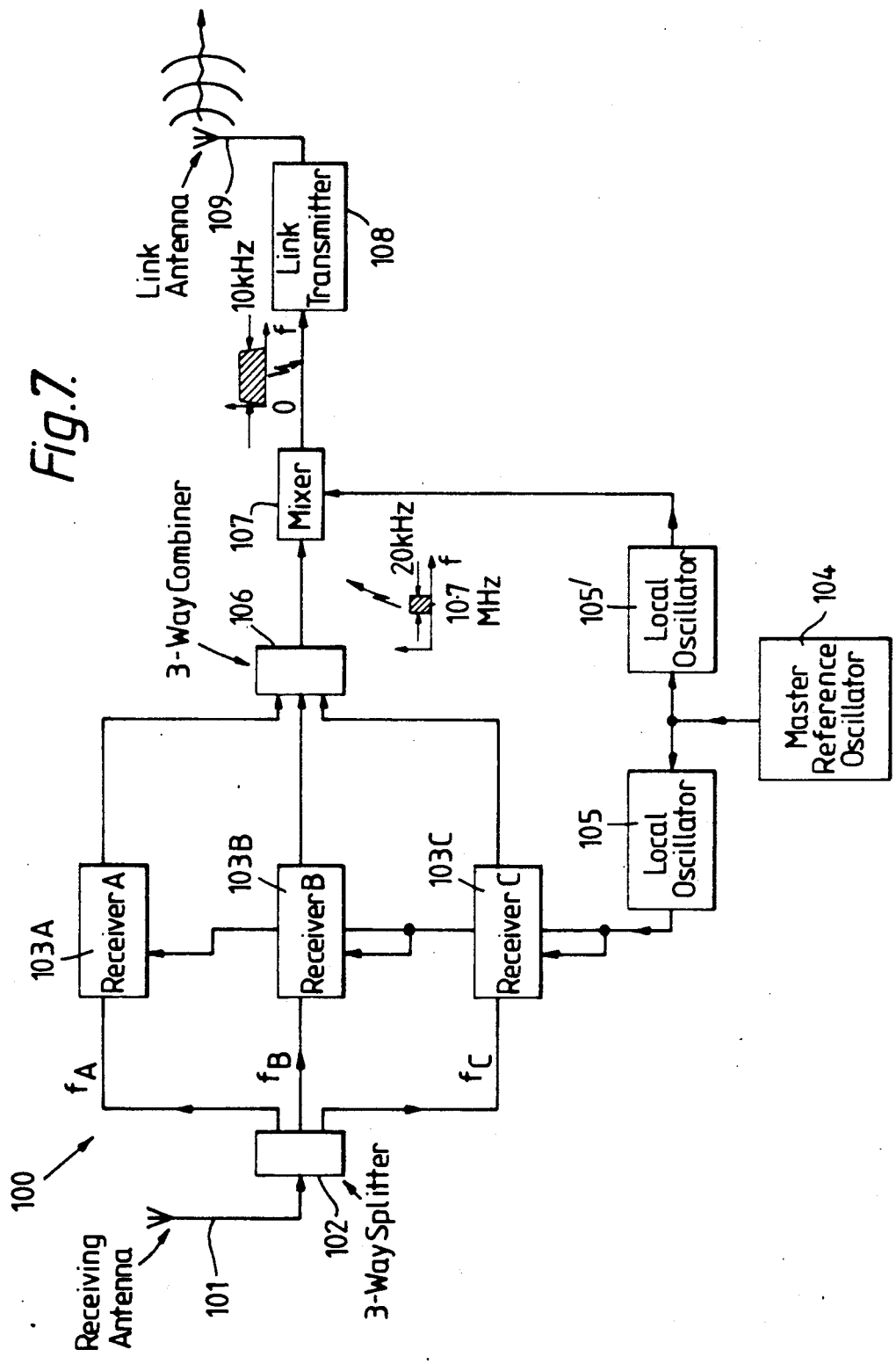
FIGS. 7 and 8 illustrate, respectively a mobile receiver unit and a base station receiver unit of a prototype.
Figure 8:
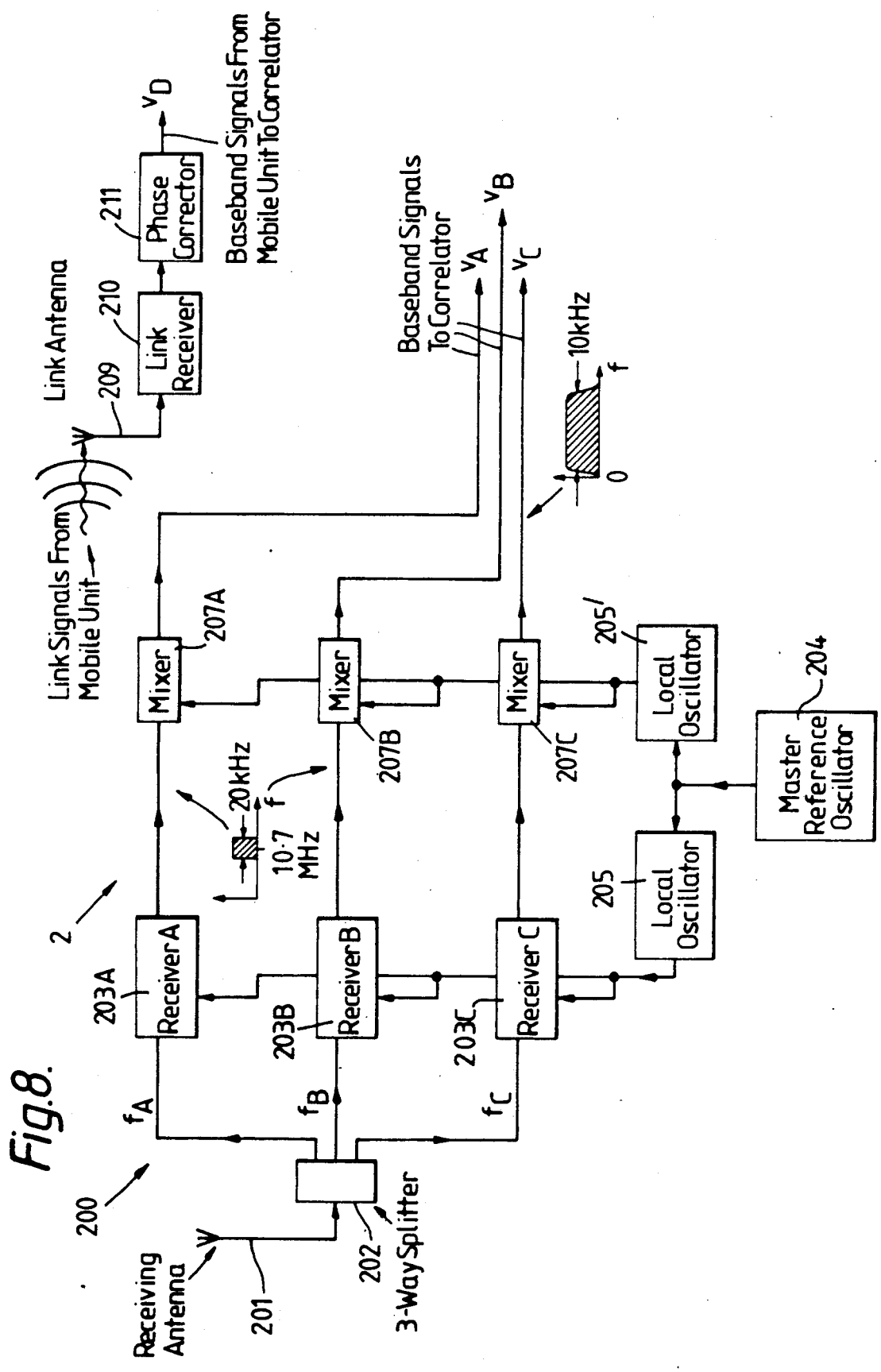
Figure 9:
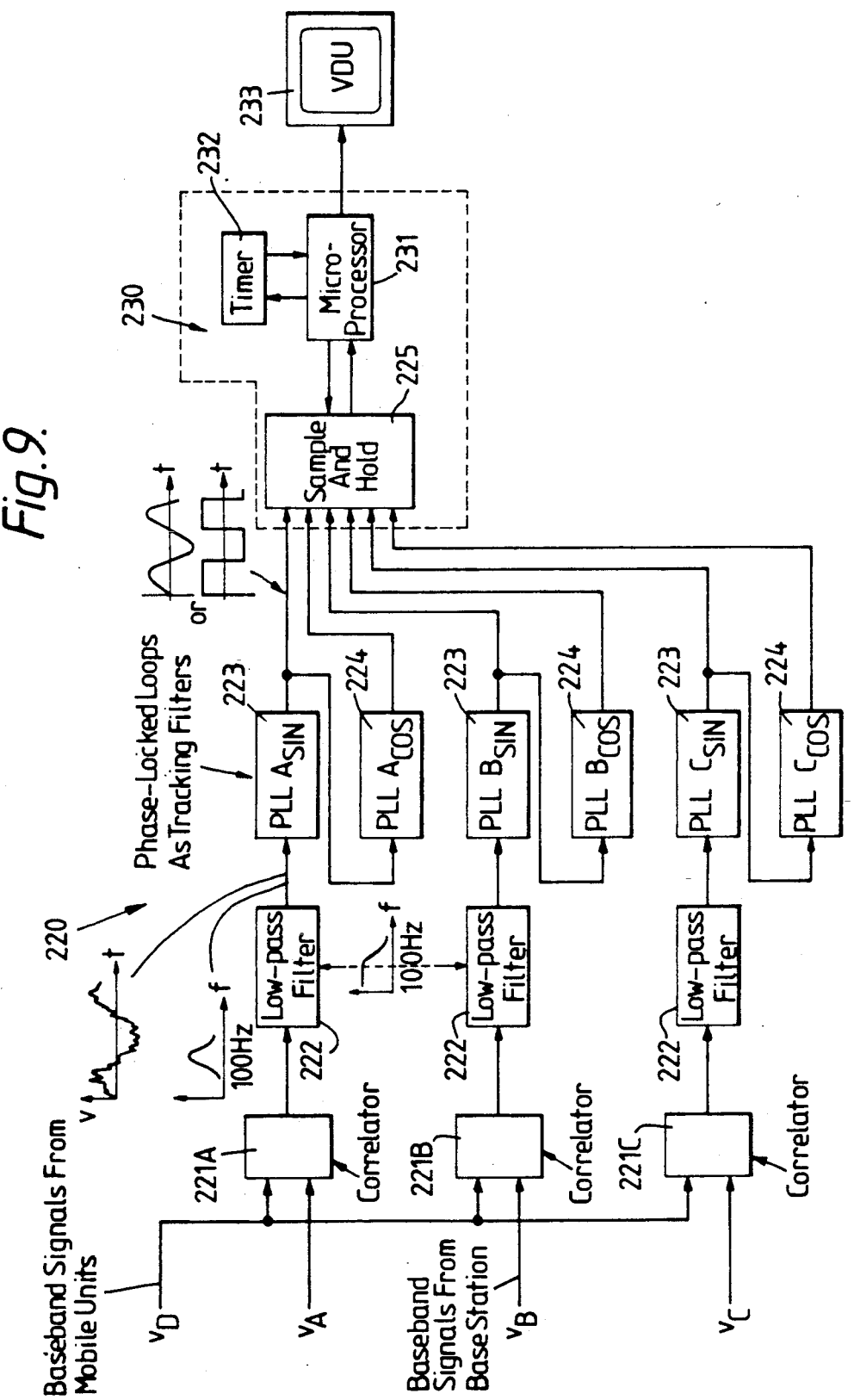
FIG. 9 illustrates a correlation/computer system for analysis of the signals received by the roving and base station receiver units.

FIG. 7 shows a roving or mobile unit receiver 100, which has a receiving antenna 101 which receives signals from three FM transmitters (A, B, C say—see FIG. 1). A three-way splitter 102 supplies the signals from the antenna to three substantially identical receivers $103_A$, $103_B$, $103_C$, each of which is tuned to receive the signals of one of the transmitters. In this example the receivers $103_A$, $103_B$, $103_C$ are shown tuned to receive signals $F_A$, $F_B$, $F_C$ of 96 MHz, 92.3 MHz and 89.7 MHz respectively, corresponding to the nominal centre frequencies of three FM transmitters in the East Anglian region of England. Suitable receivers are Sony ICF 2001D.

Each of the receivers is phase locked to a master reference oscillator 104 via a local oscillator 105 for frequency synthesis, the master oscillator being, for example a high-stability crystal oscillator or rubidium frequency standard. In the example the master oscillator outputs a 10 MHz signal and the phase-locked local oscillator has an output frequency of 6.275 MHz. The receivers output signals at an intermediate frequency, in this case 10.7 MHz, to a 3-way combiner 106, and the combined signal, is mixed to baseband in a mixer 107 using a second local oscillator 105' at 10.7015 MHz which is also phase locked to the master reference oscillator 104. The baseband signal, which has an approximate band width of 10 KHz, is passed to a link transmitter 108 which thus transmits a signal containing representations of the three received signals, via a link transmitter antenna 109, to the base station 2 (see FIG. 8), where analysis takes place.

The base station 2 has a receiver unit 200 (see FIG. 8) which in most respects is identical with the mobile unit, reference numerals increased by 100 being used for like components. However, the receiver unit 200 has plural mixers $207_A$, $207_B$, $207_C$ so that the baseband products from the three receivers are kept separate. Additionally, the master reference oscillator is offset from that of the mobile unit receiver so that the baseband signals $v_A$, $v_B$, $v_C$ rotate with respect the baseband signal $v_D$ from the mobile unit by about 100 Hz when the mobile unit is stationary.

The base station 2 also includes a link antenna 209 via which the signal from the mobile unit 1 is received in a receiver 210. A phase corrector 211 removes the differential phase shifts inherently introduced by the link transmitter and receiver circuits and outputs the baseband signal $v_D$. The link transmitter and receiver can be one of many types, but preferably transmit and receive in the VHF band for example. The phase corrector 211 is of appropriate type to correct for the type of phase response of the transmitter and receiver circuits. For example, if the phase response were like that of an R-C lag then the phase corrector would have and R-C lead configuration. In practice more complex phase responses are present, but can be corrected by conventional phase corrector circuits.

To process the baseband signals the base station has a correlator section 220 (see FIG. 9) for correlating the baseband signals and a microcomputer processor 230 for receiving the correlator products and generating a display of the position and track of the mobile unit.

The correlator section 220 has three correlators $221_A$, $221_B$, $221_C$ for correlating, respectively, the baseband signals $v_A$ & $v_D$, $v_B$ & $v_D$, and $v_C$ & $v_D$. These produce quasi-sinusoidal outputs at about 100 Hz which reflect the offset between the master reference oscillators 104, 204. The quasi-sinusoidal outputs are passed through identical low-pass filters 222 to phase locked loops (PLL) 223 where 'clean' versions of the quasi-sinusoids are produced either as sine- or as square-waves. The PLL's 223 employ narrow loop bandwidths of say less than 1 Hz in order to remove the effects of noise in the outputs of the low-pass filters 222. PLL's 224 receive the outputs of PLL's 223 to produce outputs offset by 90° with those of PLL's 223 and these may have wider bandwidths—of the order of 10 Hz.

Figure 11:
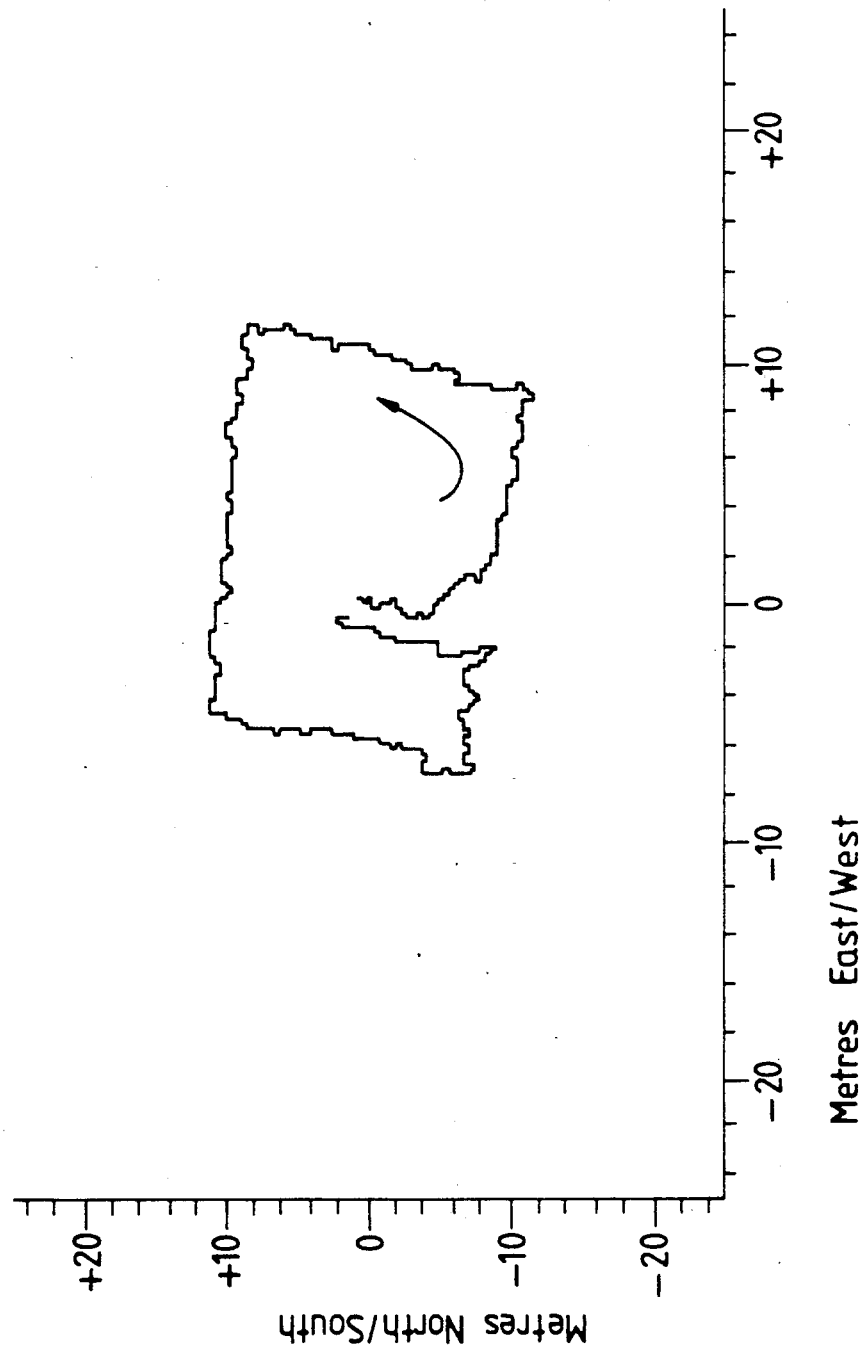
FIG. 11 shows a plot of a track of a mobile unit.

The sine and cosine products thus produced are fed to sample and hold circuits 225 on a conventional interface board in a microcomputer 230 which has a microprocessor 231 and timer 232, by means of which the data representing the products is manipulated to form a video output sent to a visual display unit 233. In the prototype the display is used to represent a track of the path of the mobile unit as shown in FIG. 11, the scale being adjustable under computer control to one of a number of desired scales.

FIG. 10A illustrates, by way of a flow chart, the main elements of the computer's operation under program control, in order to display on the VDU 233 a representation of the track of the mobile unit. After the program is entered at step S01 the timer 232 and internal data buffers in the computer are initialized in step S02 and the interrupt timing (see description below) set going in step S03. In step S04 the program checks to see whether or not a flag (set by a separate interrupt routine—see FIG. 10B) is set or not. If it is then data in the current buffer is valid and is converted to phase increments in step S05 and in step S06 the phase increments are added to the totals (for each of the A, B and C channels) to produce new totals. The position of the mobile unit is calculated in step S07 and displayed on the VDU 233 in step S08. The current-buffer-full flag is reset in step S09 and the program loops back to step S04. If the buffer-full flag is not detected in step S04 then the program loops around S04 to check again.

In connection with the flow chart of FIG. 10a, the following should be noted:

(a) The current-buffer-full flag is set by the interrupt routine as will be described below in connection with FIG. 10B.

(b) The phase difference of each channel is calculated by means of the relation:

phase = arctan (S/C)

where S and C are the values of the voltages from the sine and cosine PLL's 223, 224.

(c) The total phase elapsed since the start must be tracked, i.e. the algorithm used by the program needs to carry the phases over the principal range −180° to +180°.

(d) Calculation of present position is by means of the three equations 1A to 1C specified earlier. These may be solved in the program by any one of a number of well-known methods, the presently preferred method being to use the Newton-Raphson method (see "Numerical Recipes, the art of Scientific Computing", by W.H. Press et al, Cambridge University Press 1986) to calculate the current position using the previous position as a starting point for the iteration.

(e) The phase tracking algorithm used for each channel is as follows. If $\phi$ is the total phase tracked so far and the new data samples are S and C (for the sine and cosine channels respectively), then the phase increment $\Delta\phi$ is given by:

$$\tan \Delta\phi = (S \cos\phi - C \sin \phi)/(S \sin\phi + C \cos \phi)$$

and the new value of the tracked phase is $\phi + \Delta\phi$. As long as no phase increments greater than 180° or less than −180° occur between samples this will hold true. For this to be so see description below with regard to the interrupt service routine.

The interrupt service routine, by means of which data from the sample and hold circuits 225 is stored in one of two buffers, and which is shown in flow chart form in FIG. 10B, will now be described.

The timer 232, which is resettable, causes interrupts to occur in the operating program (FIG. 10A) at regular intervals (say 500 per second) as determined by the program. On occurence of an interrupt the interrupt routine is entered (step I01) after which the timer 232 is reset (step I02). A buffer pointer which points to the address in the current buffer to which data should next be stored is incremented or changed over (step I03) and data is then read from the sample and hold circuits 225 (step I04) and put into the current buffer (step I05). In step I06 the routine checks to see if the current buffer is full and if it is sets the flag (step I07) previously mentioned in connection with the operations program. The buffer to which data is to be stored is then changed over (step I08). If the buffer is not full, or once the buffer has been changed, the interrupts are reset (step I09) and the interrupt routine ends (step I10), allowing control of the computer to return to the main program (FIG. 10A).

There are two buffers so as to allow one to be written to during an interrupt routine while the other is being read from by the main program that has been interrupted. In the present example the buffer size and rate of reading the sample and hold circuits are chosen so that each buffer fills in about 1 second, and the reading rate is chosen so as to sample the data completely in order to ensure that no phase increments greater than +180° or less than −180° are lost between samples.

FIG. 11 is a printout or screen dump of a track of a mobile system carried by a man, showing the path followed (in the direction of the arrow) It can be seen that using equipment according to the invention a highly accurate track can be plotted in real time. The irregularities result from movement, side-to-side of the path being walked by the man, of the aerial held by him. It can be seen that resolution as good as half a metre or less can be achieved in measurements made every 0.1 second.

I claim:

1. A navigation and tracking system for receiving signals transmitted by at least one transmission source (A, B, C) equal in number at least to the number of dimensions in which the movement of a roving object is to be monitored, the system comprising:
   a pair of receiving stations (D, E), the first of the receiving stations (D) being at a known position and the second (E) being located on the roving object, each receiving station having:
   a reference oscillator;
   means for deriving from the reference oscillator a local reference signal; and
   means for generating a signal representative of the difference in frequency and hence the difference in phase between the local reference signal and the signal received from each of the transmission sources;
   means (F) for passing, as a link signal from one of the receiving stations to the other receiving station, said receiving station-generated signal representative of the phase difference between the derived local reference signal and the signal received from at least a single one of the transmission sources; and
   means (R, S, T, U) at said other receiving station for comparing the information received from said one receiving station with the representative signal generated at said other receiving station and for determining the phase difference or time delay between the received signals, and hence the change in phase difference or time delay of the signals, in order to determine the position or change in position of the roving object.

2. A system according to claim 1, further including a number of transmission sources equal at least to the number of dimensions in which movement is to be monitored plus one.

3. A system according to claim 1 or claim 2, wherein the transmissions are modulated and the phase difference is determined.

4. A system according to claim 1 or claim 2, wherein the transmissions are continuous wave, unmodulated transmissions and the phase difference is determined.

5. A system according to claim 1 or claim 2, wherein the transmissions are modulated and the timing delays are determined.

6. A system according to claim 1 or claim 2, wherein both phase difference and timing delays are determined.

7. A system according to claim 3, wherein the receiving stations convert the signals received to baseband signals by the use of local oscillators which are phase-locked to local frequency standards or reference oscillators (K, L) and the baseband signal from one of the receiving stations is transmitted to the other receiving station.

8. A system according to claim 7, further including an additional transmission source (C) for measuring the drift of the reference oscillators or frequency standards (K, L).

9. A system according to claim 7, wherein the reference oscillators (K, L) are locked to one another using the transmission link between the receiving stations.

10. A system according to claim 1, wherein a non-roving receiving station is located at the same location as one of the transmitters.

11. A system according to claim 10, wherein the link is provided in the direction from the base station to the roving object.

12. A system according to claim 11, wherein the base station has an omni-directional radiation pattern, whereby a plurality of separate roving objects can navigate using the same link signals.

13. A system according to claim 2, wherein the transmissions from at least one of the transmitters are used to provide the link between the receiving stations.

14. A system according to claim 10, wherein the same reference oscillator is used for the transmitter and co-located receiving station.

15. A system according to claim 5, wherein the means for comparing the signals received by the plural receiving stations includes means (a, b, b') for digitizing digitized signals and means (X) for correlating the digitized signals to produce point estimates of a cross-correlation function thereof.

16. A system according to claim 15, wherein an interpolation function is fitted to the point estimates of the cross-correlation function to determine the time delay between the signals.

17. A system according to claim 1, wherein each of said receiving stations comprises a local oscillator that generates a signal that is mixed by multiplication with the signals received by each receiving station.

18. A system according to claim 2, wherein a non-roving receiving station (base station) is located at the same location as one of the transmitters.

19. A system according to claim 18, wherein the link is provided in the direction from the base station to the roving object.

20. A system according to claim 19, wherein the base station has an omni-directional radiation pattern, whereby a plurality of separate roving objects can navigate using the same link signals.

* * * * *